(12) United States Patent
Chen et al.

(10) Patent No.: US 12,068,109 B2
(45) Date of Patent: Aug. 20, 2024

(54) ELECTROCHEMICAL ENERGY STORAGE DEVICE

(71) Applicant: AVX New Energy (Chengdu) Co., Ltd, Sichuan (CN)

(72) Inventors: Dezhong Chen, Sichuan (CN); Junqiang Luo, Sichuan (CN); Guangyong Dong, Sichuan (CN); Jie Xiang, Sichuan (CN); Fanghui Zhao, Sichuan (CN)

(73) Assignee: AVX New Energy (Chengdu) Co., Ltd., Chengdu (CN)

( * ) Notice: Subject to any disclaimer, the term of this patent is extended or adjusted under 35 U.S.C. 154(b) by 431 days.

(21) Appl. No.: 17/618,552

(22) PCT Filed: Jun. 8, 2020

(86) PCT No.: PCT/CN2020/094926
§ 371 (c)(1),
(2) Date: Jun. 23, 2022

(87) PCT Pub. No.: WO2020/248940
PCT Pub. Date: Dec. 17, 2020

(65) Prior Publication Data
US 2022/0336151 A1    Oct. 20, 2022

(30) Foreign Application Priority Data
Jun. 11, 2019   (CN) .......................... 201910502335.6

(51) Int. Cl.
*H01G 11/80*   (2013.01)
*H01G 11/18*   (2013.01)
(Continued)

(52) U.S. Cl.
CPC ............. *H01G 11/80* (2013.01); *H01G 11/18* (2013.01); *H01G 11/74* (2013.01); *H01G 11/82* (2013.01)

(58) Field of Classification Search
CPC ........ H01G 11/82; H01G 11/14; H01G 11/80; H01G 11/74
See application file for complete search history.

(56) References Cited

U.S. PATENT DOCUMENTS 9,287,059 B2    3/2016   Miura et al.
10,074,488 B2   9/2018   Lee et al.
(Continued)

FOREIGN PATENT DOCUMENTS

CN    101877332    11/2010
CN    201638692    11/2010
(Continued)

OTHER PUBLICATIONS

EESR for EP Patent Application No. 20823017.7 dated Jun. 9, 2023, 9 pages.
(Continued)

*Primary Examiner* — David M Sinclair
(74) *Attorney, Agent, or Firm* — Dority & Manning, P.A.

(57) ABSTRACT

An electrochemical energy storage device comprises: a cover plate (4), comprising a lead-out bar (41) and a fixing plate (42), wherein the lead-out bar (41) is a conductor, the fixing plate (42) is an insulator, and the lead-out bar (41) vertically passes through the fixing plate (42) and is fixed thereon; a housing (9), which is cylindrical and is provided with an opening at at least one end thereof, wherein the insulating fixing plate (42) and the opening of the housing (9) are connected in a sealed manner by means of a sealing ring (2); and a rolled core (7), provided in an inner cavity of the housing (9), wherein the rolled core (7) is conductively
(Continued)

connected to the lead-out bar (41) by means of an upper connecting piece (6), and is conductively connected to another lead-out end of the housing (9) by means of a lower connecting piece (8); and the device further comprises: a welding ring (1), conductively connected to the housing (9) by means of welding, and a welding bar (3), conductively connected to the lead-out bar (41) of the cover plate (4) by means of welding, wherein the welding ring (1) and the welding bar (3) are provided on the same side of the housing (9). The upper connecting piece (6) and the lower connecting piece (8) respectively lead out the positive electrode and the negative electrode of the electrochemical energy storage device, and lead the positive electrode and the negative electrode to the outside. The device is led out at two ends, has a low internal resistance, and can be tin-soldered, thereby facilitating the assembly of modules.

10 Claims, 8 Drawing Sheets

(51) Int. Cl.
*H01G 11/74* (2013.01)
*H01G 11/82* (2013.01)

(56) References Cited

U.S. PATENT DOCUMENTS

| | | | |
|---|---|---|---|
| 10,186,692 | B2 | 1/2019 | Sekiya et al. |
| 10,622,165 | B2 | 4/2020 | Lee |
| 11,139,517 | B2 | 10/2021 | Yang et al. |
| 2008/0026291 | A1 | 1/2008 | Kim |
| 2009/0087733 | A1 | 4/2009 | Yoon et al. |
| 2012/0218680 | A1* | 8/2012 | Wetherill ............ H01G 11/82 361/502 |
| 2014/0293510 | A1* | 10/2014 | Miura ............ H01G 11/52 361/502 |
| 2016/0343997 | A1 | 11/2016 | Sekiya et al. |
| 2020/0035959 | A1 | 1/2020 | Yang et al. |
| 2020/0219667 | A1 | 7/2020 | Hansen |

FOREIGN PATENT DOCUMENTS

| | | | |
|---|---|---|---|
| CN | 102543487 | | 7/2012 |
| CN | 202796465 | | 3/2013 |
| CN | 202887989 | | 4/2013 |
| CN | 202887989 | U * | 4/2013 |
| CN | 203536508 | | 4/2014 |
| CN | 203660004 | | 6/2014 |
| CN | 203706896 | | 7/2014 |
| CN | 203746672 | | 7/2014 |
| CN | 204067076 | | 12/2014 |
| CN | 106920703 | | 7/2017 |
| CN | 207165429 | | 3/2018 |
| CN | 207165430 | | 3/2018 |
| CN | 208027913 | | 10/2018 |
| CN | 109461589 | | 3/2019 |
| CN | 109786133 | | 5/2019 |
| CN | 110299249 | | 10/2019 |
| CN | 209947672 | | 1/2020 |
| CN | 209947675 | | 1/2020 |
| JP | S5038434 | U | 4/1975 |
| JP | 10275751 | A * | 10/1998 |
| JP | H10275751 | | 10/1998 |
| JP | 2000269099 | A * | 9/2000 |
| JP | 2002100342 | | 4/2002 |
| JP | S3410861 | | 5/2003 |
| JP | 2004247056 | | 9/2004 |
| JP | 2006313794 | | 11/2006 |
| JP | 2009141102 | | 6/2009 |
| JP | 2010098025 | | 4/2010 |
| JP | 2014209526 | | 11/2014 |
| KR | 20180021952 | | 3/2018 |
| WO | WO2005076296 | | 8/2005 |
| WO | WO2012114748 | | 8/2012 |

OTHER PUBLICATIONS

International Search Report for PCT/CN2020/094926 mailed Sep. 9, 2020, 3 pages.

* cited by examiner

ELECTROCHEMICAL ENERGY STORAGE DEVICE

TECHNICAL FIELD

The present invention relates to the technical field of electrochemical energy storage devices, and in particular to an electrochemical energy storage device.

BACKGROUND OF THE INVENTION

Supercapacitors, also known as electrochemical capacitors, are electrochemical devices that store energy through polarized electrolytes. Thanks to their high power density, short charging time, and long service life, more and more importance has been placed on these capacitors as auxiliary energy sources in the storage systems of electric vehicles and smart grids. A capacitor structured with both the positive electrode and the negative electrode on the same side of the housing is called a radial capacitor; large-to-medium-sized capacitors usually have the two leads at the two ends. A supercapacitor with the leads at two ends has a much lower internal resistance than a radial capacitor, and may have a higher discharging current, thereby improving the power performance of the supercapacitor.

For the product to be tin-soldered on a circuit board, axial capacitors at present usually use an aluminum housing as the conductor, and one electrode is led from the bottom to one end of the cover plate. The cover plate is usually made of aluminum, and is usually sealedly and conductively connected to the housing by laser welding. The other electrode is usually provided at the center of the cover plate and is isolated from the cover plate by means of an insulating sealing gasket. Laser sealing poses the risk of liquid leakage, and the process is complex.

Moreover, the insulating sealing gasket between the central electrode and the cover plate poses the risk of liquid leakage and short circuit. In addition, for sealing, the central electrode is generally small, and the conductivity is poor. The insulating sealing gasket is not good for heat dissipation. Since the central sealing gasket is made of elastic rubber, it is easy to deform, which results in liquid leakage when under stress; during high-temperature baking for dehydration, the sealing gasket and the aluminum deform to different extents, which may also result in liquid leakage.

BRIEF SUMMARY OF THE INVENTION

The purpose of the present invention is to provide an electrochemical energy storage device to solve the problems in the prior art.

To achieve the above purpose, the present invention adopts the following technical solution:

an electrochemical energy storage device, comprising:
a cover plate, comprising a lead-out bar and a fixing plate, wherein the lead-out bar is a conductor, the fixing plate is an insulator, and the lead-out bar vertically passes through the fixing plate and is fixed thereon;
a housing, which is cylindrical and is provided with an opening at at least one end, wherein the fixing plate and the opening of the housing are connected in a sealed manner by means of a sealing ring; and
a rolled core, provided in an inner cavity of the housing, wherein the rolled core is conductively connected to the lead-out bar by means of an upper connecting piece, and is conductively connected to another lead-out end of the housing by means of a lower connecting piece; and further comprising:
a welding ring, conductively connected to the housing by welding; and
a welding bar, conductively connected to the lead-out bar of the cover plate by welding, wherein the welding ring and the welding bar are provided on the same side of the housing.

Further, the welding ring is tin-plated, a first curled edge for welding with the housing is provided at the circumference of the welding ring, and at least one welding terminal with a hole is provided at its center for conduction and fixing the welding ring when welded to a circuit board.

Further, at least one projection is provided on the first curled edge, and the projection corresponds to the welding terminal.

Further, the upper connecting piece is made of aluminum, and is fixed to the lead-out bar by laser welding; an upper hole for electrolyte permeation is provided on the circumference of the upper connecting piece.

Further, an upper hollow cylinder is provided at the center of the upper connecting piece, which is used to be placed in the pinhole at the center of the rolled core; an upper curled edge is provided on part of the circumference of the upper connecting piece, which is used for fixing the outer layer of the rolled core; an aluminum strip is connected to the upper connecting piece, which is used for welding with the lead-out bar of the cover plate.

Further, an insulation tube is sleeved on the upper curled edge on part of the circumference of the upper connecting piece.

Further, the lead-out bar is an aluminum bar, and the fixing plate is a resin plate; the cover plate is in a stepped ring shape, the lead-out bar is provided at the center of the fixing plate, and a fixing hole for fixing the welding bar is provided at the center of the end of the lead-out bar farther away from the housing.

Further, the welding bar comprises a first bar and a second bar provided at the bottom of the first bar, wherein the first bar is tin-plated, the diameter of the first bar is smaller than that of the second bar, and the second bar is mounted in the fixing hole.

Further, the lower connecting piece is made of aluminum, and is fixed to the housing by laser welding; a lower hole for electrolyte permeation is provided on the circumference of the lower connecting piece.

Further, a lower hollow cylinder is provided at the center of the lower connecting piece, which is used for fitting with the positioning bar at the bottom of the housing and the central pinhole of the rolled core; a lower curled edge for fixing the rolled core is provided on the circumference of the lower connecting piece.

Compared with the prior art, the present invention has the following benefits:

1. The present invention discloses an electrochemical energy storage device, comprising structures such as a cover plate, a housing, a rolled core, an upper connecting piece, a lower connecting piece, a welding bar, a welding ring, etc., wherein the cover plate comprises a lead-out bar and a fixing plate, the lead-out bar is a conductor, the fixing plate is an insulator, the lead-out bar vertically passes through the fixing plate and is fixed thereon, and a welding bar is welded to the end of the lead-out bar as one electrode of the device, thereby facilitating welding to a circuit board. The housing is cylindrical and is provided with an opening at at least one end; the insulating fixing plate and the opening of the housing are connected in a sealed manner by means of a sealing ring; the rolled core is provided in an inner cavity of the housing; the rolled core is conductively connected to the lead-out bar by means of an upper connecting piece, and is conductively connected to another lead-out end of the housing by means of a lower connecting piece; the welding ring is welded to the housing and acts as another electrode of the device; the upper connecting piece and the lower connecting piece respectively lead out the positive electrode and the negative electrode of the electrochemical energy storage device, and lead the positive and the negative electrodes to the outside; the device is led out on two ends, has a low internal resistance, and can be tin-soldered, thereby facilitating the assembly of modules.

2. In the present invention, fixing of the upper connecting piece is improved through fitting between the upper hollow cylinder, an upper curled edge and the rolled core, and fixing of the lower connecting piece is improved through fitting between the lower hollow cylinder, a lower curled edge and the rolled core, thereby enhancing shock resistance. The upper connecting piece is isolated from the housing and is fixed thereon by means of an insulation tube resistant to high temperature, and the lower connecting piece is fixed on the housing by means of tight fitting or a positioning bar. During use, the upper connecting piece and the lower connecting piece are firmly fixed on the housing, and thus have good shock resistance.

3. In the present invention, the upper connecting piece has upper holes, and the lower connecting piece has lower holes, thereby facilitating electrolyte permeation; the welding bar and the welding ring are respectively the positive electrode and the negative electrode of the device, and can be welded to a circuit board.

4. In the present invention, the cover plate comprises a lead-out bar and a fixing plate, which are joined to form a whole. The lead-out bar is isolated from the housing by means of the fixing plate, and good insulation is achieved without the need of other insulating materials.

5. At least one projection, preferably three projections, is provided on the curled edge of the present invention. The projection corresponds to a welding terminal, and is intended to position the welding ring on a circuit board and to maintain a point contact between the welding ring and the circuit board while providing a gap for wires, thereby ensuring insulation and facilitating air flow and heat dissipation.

Figure 1:
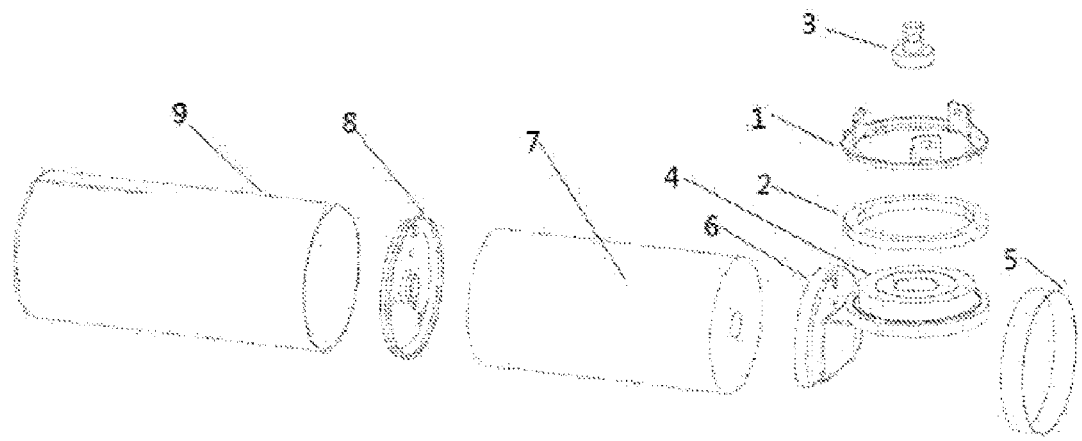
FIG. 1 is an exploded structural diagram of an electrochemical energy storage device of the present invention.

Reference numerals in the drawings: 1—welding ring, 2—sealing ring, 3—welding bar, 4—cover plate, 5—insulation tube, 6—upper connecting piece, 7—rolled core, 8—lower connecting piece, 9—housing, 11—first curled edge, 12—welding terminal, 13—projection, 31—first bar, 32—second bar, 41—lead-out bar, 41—upper positioning hole, 42—fixing plate, 61—upper hollow cylinder, 62—upper hole, 63—upper curled edge, 64—aluminum strip, 71—pinhole of the rolled core, 81—lower hollow cylinder, 82—lower hole, 83—lower curled edge, 91—positioning bar, 411—fixing hole.

DETAILED DESCRIPTION OF THE EMBODIMENTS

The present invention will be further described below in conjunction with the embodiments. The described embodiments are only some of the embodiments of the present invention, but not all the embodiments. Based on the embodiments of the present invention, all other embodiments obtained by those ordinarily skilled in the art without inventive work shall fall within the scope of the present invention.

Embodiment 1

Figure 2:
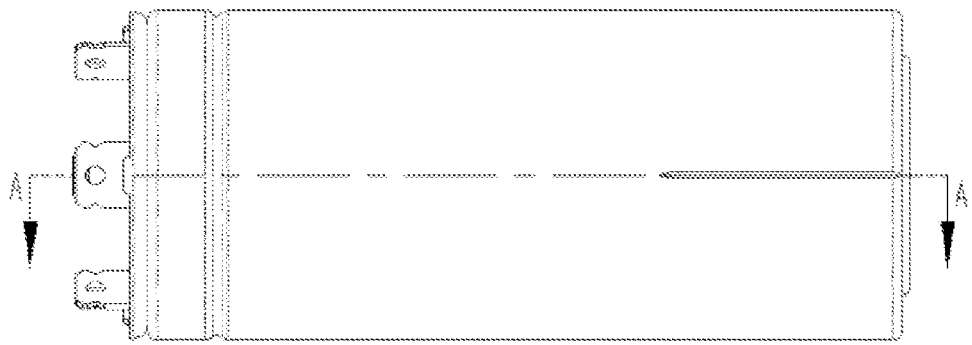
FIG. 2 is a schematic structural diagram of an electrochemical energy storage device of the present invention after assembling.
Figure 3:
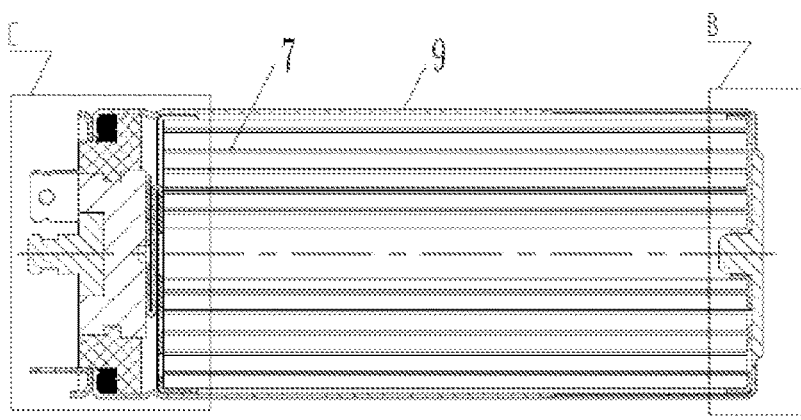
FIG. 3 is an A-A section view of FIG. 2.

As shown in FIGS. 1 to 3, an electrochemical energy storage device comprises: a cover plate 4, comprising a lead-out bar 41 and a fixing plate 42, wherein the lead-out bar 41 is a conductor, the fixing plate 42 is an insulator, and the lead-out bar 41 vertically passes through the fixing plate 42 and is fixed thereon; a housing 9, which is cylindrical and is provided with an opening at at least one end, wherein the fixing plate 42 and the opening of the housing 9 are connected in a sealed manner by means of a sealing ring 2; and a rolled core 7, provided in an inner cavity of the housing 9, wherein the rolled core 7 is conductively connected to the lead-out bar 41 by means of an upper connecting piece 6, and is conductively connected to another lead-out end of the housing 9 by means of a lower connecting piece 8; and the device further comprises: a welding ring 1, conductively connected to the lead-out bar 41 of the cover plate 4 by welding, wherein the welding ring 1 and the welding bar 3 are provided on the same side of the housing 9.

Figure 12:
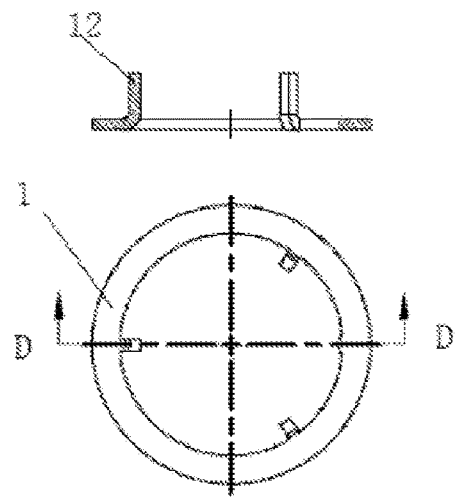
FIG. 12 is a schematic structural diagram of the welding ring without a curled edge in embodiment 1.
Figure 13:
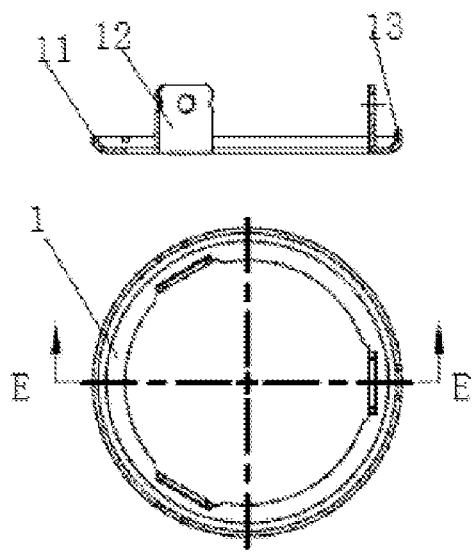
FIG. 13 is a schematic structural diagram of the welding ring with a curled edge in embodiment 1.

As shown in FIG. 13, the welding ring 1 is tin-plated, thereby facilitating welding to a circuit board; a first curled edge 11 used for welding with the housing 9 is provided on the circumference of the welding ring 1, to enhance the strength of the welding ring 1 and to facilitate welding with a curled edge of the housing 9; this structure is used when the plate used for the welding ring is thin. As shown in FIG. 12, when the welding ring is thick, there is no need of a curled edge on the circumference of the welding ring to ensure the strength of the welding ring and to ensure welding with a curled edge of the housing. At least one welding terminal 12 with a hole is provided at its center for conduction and fixing the welding ring 1 when welded to a circuit board. In this embodiment, three welding terminals 12 are provided at an equal spacing at the center of the welding ring 1, which are used for conduction and fixing the welding ring 1 to a circuit board; the three welding terminals 12 can define the plane of the circuit board, thereby facilitating positioning.

Figure 6:
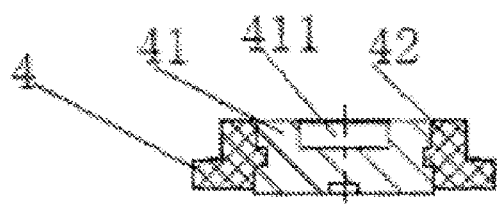
FIG. 6 is a schematic structural diagram of the cover plate of an electrochemical energy storage device of the present invention.

As shown in FIG. 6, in this embodiment, the lead-out bar 41 is an aluminum bar, and the fixing plate 42 is a resin plate; the cover plate 4 is in a stepped ring shape, the lead-out bar 41 is provided at the center of the fixing plate 42, and a fixing hole 411 for fixing the welding bar 3 is provided at the center of the end of the lead-out bar 41 farther away from the housing 9.

To further optimize the above technical solution, at least one projection 13 is provided on the first curled edge 11, and the projection 13 corresponds to the welding terminal 12. In this embodiment, three projections 13 are provided, and the projections 13 are intended to position the welding ring 1 on a circuit board and to maintain point contacts between the welding ring 1 and the circuit board while providing gaps for wires, thereby ensuring insulation and facilitating air flow and heat dissipation.

Preferably, the upper connecting piece 6 is made of aluminum, and is fixed to the lead-out bar 41 by laser welding; an upper hole 62 for electrolyte permeation is provided on the circumference of the upper connecting piece 6. This makes it easy for the electrolyte to permeate.

Figure 4:
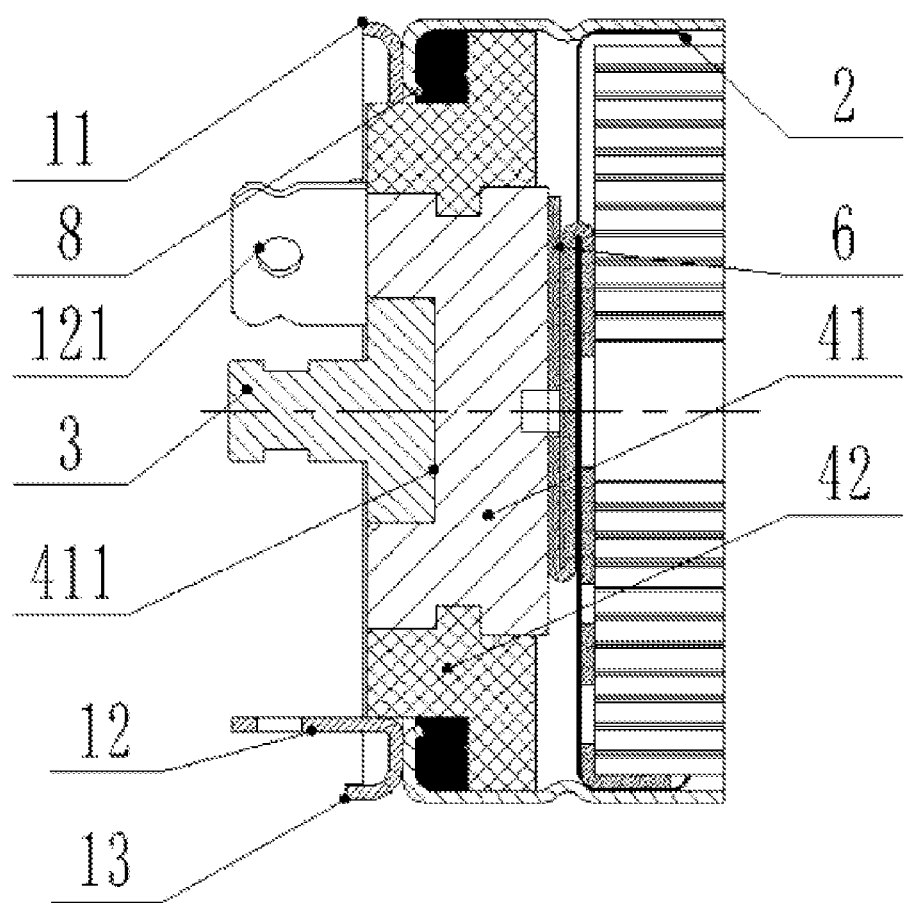
FIG. 4 is a detailed schematic diagram of A in FIG. 3.
Figure 5:
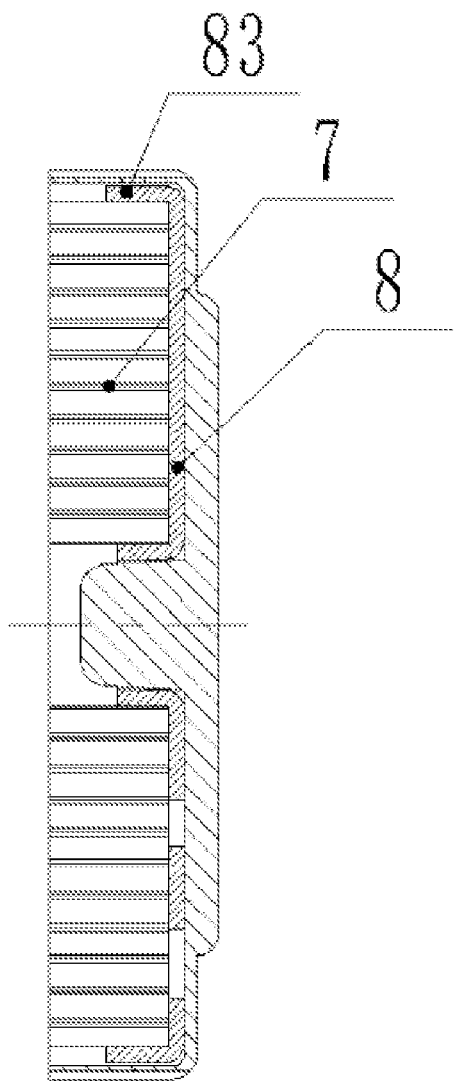
FIG. 5 is a detailed schematic diagram of B in FIG. 3.

As shown in FIGS. 4 and 5, the present invention discloses an electrochemical energy storage device, comprising structures such as a cover plate 4, a housing 9, a rolled core 7, an upper connecting piece 6, a lower connecting piece 8, a welding bar 3, a welding ring 1, etc., wherein the cover plate 4 comprises a lead-out bar 41 and a fixing plate 42, the lead-out bar 41 is a conductor, the fixing plate 42 is an insulator, the lead-out bar 41 vertically passes through the fixing plate 42 and is fixed thereon, and a welding bar 3 is welded to the end of the lead-out bar 41 as one electrode of the device, thereby facilitating welding to a circuit board. The housing 9 is cylindrical and is provided with an opening at at least one end; the insulating fixing plate 42 and the opening of the housing 9 are connected in a sealed manner by means of a sealing ring 2; the rolled core 7 is provided in an inner cavity of the housing 9; the rolled core 7 is conductively connected to the lead-out bar 41 by means of the upper connecting piece 6, and is conductively connected to another lead-out end of the housing 9 by means of the lower connecting piece 8; the welding ring 1 is welded to the housing 9 and acts as another electrode of the device; the upper connecting piece 6 and the lower connecting piece 8 respectively lead out the positive electrode and the negative electrode of the electrochemical energy storage device, and lead the positive and the negative electrodes to the outside; the device is led out on two ends, has a low internal resistance, and can be tin-soldered, thereby facilitating the assembly of modules.

Embodiment 2

Figure 7:
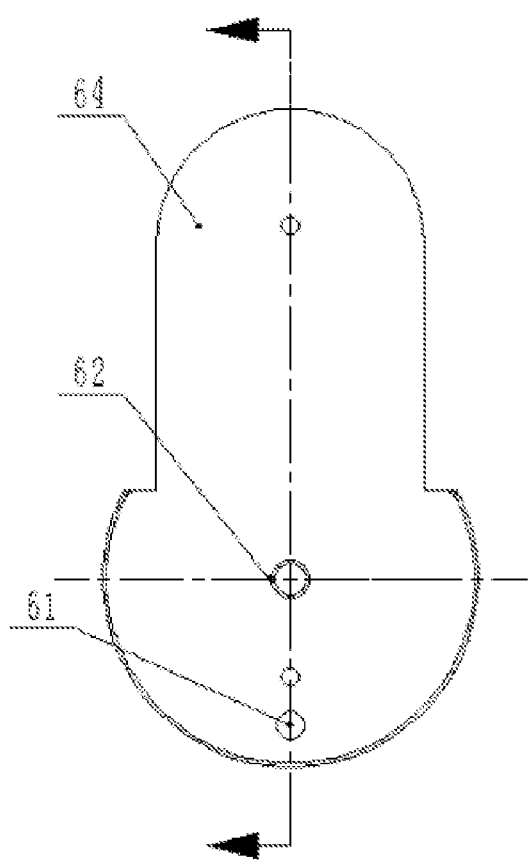
FIG. 7 is a top view of the upper connecting piece of an electrochemical energy storage device of the present invention.
Figure 8:
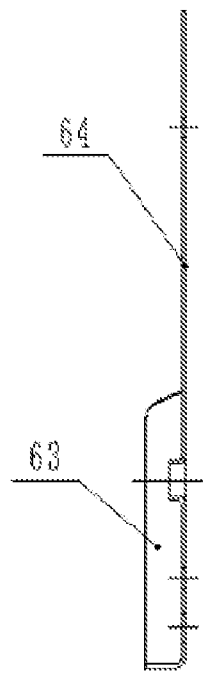
FIG. 8 is a side view of the upper connecting piece of an electrochemical energy storage device of the present invention.
Figure 15:
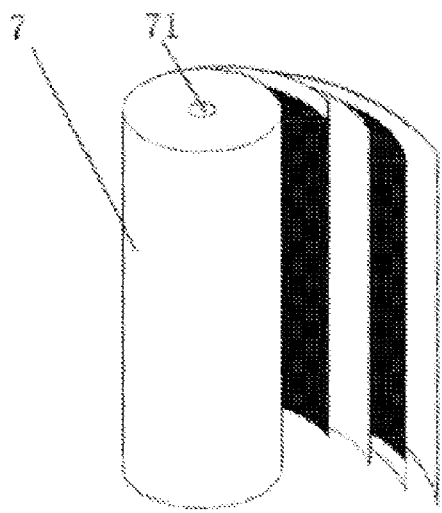
FIG. 15 is a schematic structural diagram of the rolled core of an electrochemical energy storage device of the present invention.

As shown in FIGS. 7 and 8, this embodiment is a further optimization based on embodiment 1. The improvements compared with embodiment 1 will be the focus of the description for this embodiment, and similarities will not be repeated. In this embodiment, an upper hollow cylinder 61 is provided at the center of the upper connecting piece 6, which is used to be placed in the pinhole 71 at the center of the rolled core 7, as shown in FIG. 15; an upper curled edge 63 is provided on part of the circumference of the upper connecting piece 6, which is used for fixing the outer layer of the rolled core 7 to improve shock resistance; an aluminum strip is connected to the upper connecting piece 6, which is used for welding with the lead-out bar 41 of the cover plate 4. For assembling, after fixing by welding, the upper connecting piece 6 is bent.

Embodiment 3

This embodiment is a further optimization based on embodiment 2. The improvements of this embodiment compared with embodiment 2 will be the focus of the description, and similarities will not be repeated. In this embodiment, an insulation tube 5 is sleeved on the upper curled edge 63 on part of the circumference of the upper connecting piece 6. The insulation tube 5 is inserted into the upper curled edge 63 on part of the circumference of the upper connecting piece 6, the upper curled edge 63 is sleeved on part of the outer layer of the rolled core 7, the rolled core 7 is then placed in the housing 9, and the insulation tube 5 acts for insulation and fixing between the rolled core 7 and the housing 9.

Embodiment 4

Figure 14:
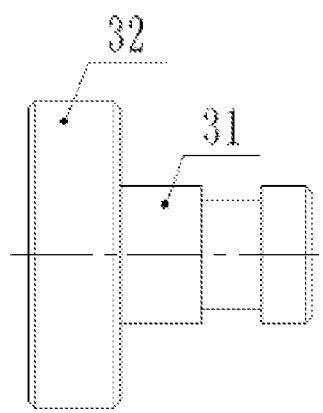
FIG. 14 is a schematic structural diagram of the welding bar of an electrochemical energy storage device of the present invention.

As shown in FIG. 14, this embodiment is a further optimization based on embodiment 3. The improvements compared with embodiment 3 will be the focus of the description for this embodiment, and similarities will not be repeated. In this embodiment, the welding bar 3 comprises a first bar 31 and a second bar 32 provided at the bottom of the first bar 31, wherein the first bar 31 is tin-plated, to facilitate welding to a circuit board; the diameter of the first bar 31 is smaller than that of the second bar 32, and the second bar 32 is mounted in the fixing hole 411, and is conductively connected to the lead-out bar 41 by welding.

Embodiment 5

Figure 9:
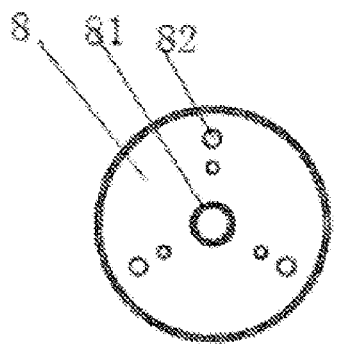
FIG. 9 is a top view of the lower connecting piece of an electrochemical energy storage device of the present invention.
Figure 10:
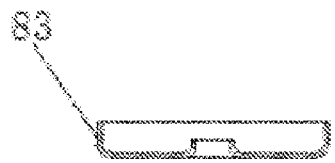
FIG. 10 is a front view of the lower connecting piece of an electrochemical energy storage device of the present invention.
Figure 11:
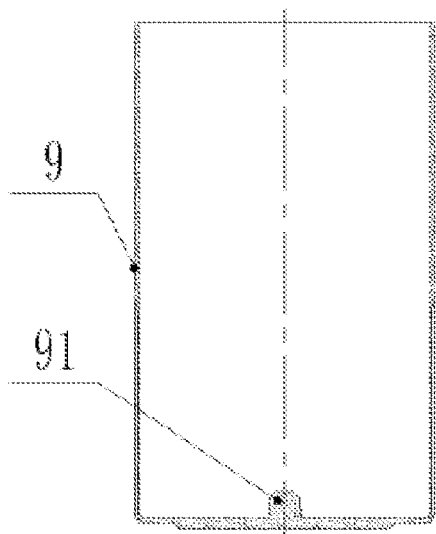
FIG. 11 is a schematic structural diagram of the housing of an electrochemical energy storage device of the present invention.

As shown in FIGS. 9 and 10, this embodiment is a further optimization based on embodiment 4, the improvements compared with embodiment 4 will be the focus of description for this embodiment, and similarities will not be repeated. In this embodiment, a lower hollow cylinder 81 is provided at the center of the lower connecting piece 8, which is used to fit with the positioning bar 91 at the bottom of the housing 9 and the central pinhole 71 of the rolled core 7, as shown in FIG. 11; a lower curled edge 83 used for fixing the outer layer of the rolled core 7 is provided on the circumference of the lower connecting piece 8. The lower hollow cylinder 81 at the center of the lower connecting piece 8 can be placed in the central pinhole 71 of the rolled core 7, and the positioning bar 91 at the bottom of the housing 9 is then placed into the hollow cylinder, thereby the rolled core 7 is positioned and fixed; the lower curled edge 83 on the circumference of the lower connecting piece 8 can fix the outer layer of the rolled core 7, thereby improving shock resistance.

The above are only the preferred embodiments of the present invention, and are not intended to limit the present invention. Any modification, equivalent replacement or improvement made without departing from the motivation and principle of the present invention shall be included in its scope.

The invention claimed is:

1. An electrochemical energy storage device, comprising:
   a cover plate (4), comprising a lead-out bar (41) and a fixing plate (42), wherein the lead-out bar (41) is a conductor, the fixing plate (42) is an insulator, and the lead-out bar (41) vertically passes through the fixing plate (42) and is fixed thereon;
   a housing (9), which is cylindrical and is provided with an opening at at least one end, wherein the insulating fixing plate (42) and the opening of the housing (9) are connected in a sealed manner by means of a sealing ring (2); and
   a rolled core (7), provided in an inner cavity of the housing (9), wherein the rolled core (7) is conductively connected to the lead-out bar (41) by means of an upper connecting piece (6), and is conductively connected to another lead-out end of the housing (9) by means of a lower connecting piece (8); and characterized in that it further comprises:
   a welding ring (1), conductively connected to the housing (9) by welding; and
   a welding bar (3), conductively connected to the lead-out bar (41) of the cover plate (4) by welding, wherein the welding ring (1) and the welding bar (3) are provided on the same side of the housing (9).

2. The electrochemical energy storage device according to claim 1, characterized in that the welding ring (1) is tin-plated, a first curled edge (11) for welding with the housing (9) is provided at the circumference of the welding ring (1), and at least one welding terminal (12) with a hole is provided at its center for conduction and fixing the welding ring (1) when welded to a circuit board.

3. The electrochemical energy storage device according to claim 2, characterized in that at least one projection (13) is provided on the first curled edge (11), and the projection (13) corresponds to the welding terminal (12).

4. The electrochemical energy storage device according to claim 1, characterized in that the upper connecting piece (6) is made of aluminum, and is fixed to the lead-out bar (41) by laser welding; an upper hole (62) for electrolyte permeation is provided on the circumference of the upper connecting piece (6).

5. The electrochemical energy storage device according to claim 4, characterized in that an upper hollow cylinder (61) is provided at the center of the upper connecting piece (6), which is used to be placed in the pinhole (71) at the center of the rolled core (7); an upper curled edge (63) is provided on part of the circumference of the upper connecting piece (6), which is used for fixing the outer layer of the rolled core (7); an aluminum strip is connected to the upper connecting piece (6), which is used for welding with the lead-out bar (41) of the cover plate (4).

6. The electrochemical energy storage device according to claim 5, characterized in that an insulation tube (5) is sleeved on the upper curled edge (63) on part of the circumference of the upper connecting piece (6).

7. The electrochemical energy storage device according to claim 1, characterized in that the lead-out bar (41) is an aluminum bar, and the fixing plate (42) is a resin plate; the cover plate (4) is in a stepped ring shape, the lead-out bar (41) is provided at the center of the fixing plate (42), and a fixing hole (411) for fixing the welding bar (3) is provided at the center of the end of the lead-out bar (41) farther away from the housing (9).

8. The electrochemical energy storage device according to claim 7, characterized in that the welding bar (3) comprises a first bar (31) and a second bar (32) provided at the bottom of the first bar (31), wherein the first bar (31) is tin-plated, the diameter of the first bar (31) is smaller than that of the second bar (32), and the second bar (32) is mounted in the fixing hole (411).

9. The electrochemical energy storage device according to claim 1, characterized in that the lower connecting piece (8) is made of aluminum, and is fixed to the housing (9) by laser welding; a lower hole (82) for electrolyte permeation is provided on the circumference of the lower connecting piece (8).

10. The electrochemical energy storage device according to claim 9, characterized in that a lower hollow cylinder (81) is provided at the center of the lower connecting piece (8), which is used for fitting with the positioning bar (91) at the bottom of the housing (9) and the central pinhole (71) of the rolled core (7); a lower curled edge (83) for fixing the rolled core (7) is provided on the circumference of the lower connecting piece (8).

* * * * *